(12) United States Patent
Rangarajan et al.

(10) Patent No.: US 11,546,689 B2
(45) Date of Patent: Jan. 3, 2023

(54) SYSTEMS AND METHODS FOR AUDIO PROCESSING

(71) Applicant: Ford Global Technologies, LLC, Dearborn, MI (US)

(72) Inventors: Ranjani Rangarajan, Farmington Hills, MI (US); Leah Busch, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 103 days.

(21) Appl. No.: 17/061,708

(22) Filed: Oct. 2, 2020

(65) Prior Publication Data
US 2022/0109927 A1 Apr. 7, 2022

(51) Int. Cl.
| | | |
|---|---|---|
| *H04R 1/40* | (2006.01) | |
| *B60R 16/023* | (2006.01) | |
| *H04R 1/32* | (2006.01) | |
| *H04R 3/00* | (2006.01) | |
| *G10L 25/18* | (2013.01) | |
| *G10L 15/30* | (2013.01) | |
| *G10L 19/02* | (2013.01) | |
| *G10L 13/033* | (2013.01) | |
| *G10L 21/0308* | (2013.01) | |

(52) U.S. Cl.
CPC .......... *H04R 1/406* (2013.01); *B60R 16/023* (2013.01); *H04R 1/326* (2013.01); *H04R 3/005* (2013.01); *G10L 13/0335* (2013.01); *G10L 15/30* (2013.01); *G10L 19/02* (2013.01); *G10L 21/0308* (2013.01); *G10L 25/18* (2013.01)

(58) Field of Classification Search
CPC ........ H04R 1/406; H04R 3/005; H04R 1/326; B60R 16/023; G10L 15/30; G10L 25/18; G10L 13/0335; G10L 21/0308; G10L 19/02; G10L 21/0205
See application file for complete search history.

(56) References Cited

U.S. PATENT DOCUMENTS

| | | | |
|---|---|---|---|
| 6,862,356 B1 * | 3/2005 | Makino | H04S 7/302 381/1 |
| 7,327,852 B2 | 2/2008 | Ruwisch | |
| 9,549,274 B2 | 1/2017 | Nakamura et al. | |
| 2005/0091042 A1 * | 4/2005 | Acero | G10L 25/78 704/205 |

(Continued)

FOREIGN PATENT DOCUMENTS

JP 2005234479 A 9/2005

OTHER PUBLICATIONS

Smaragdis, Information Theoretic Approaches to Source Separation (Year: 1997).*

(Continued)

*Primary Examiner* — Matthew A Eason
*Assistant Examiner* — Kuassi A Ganmavo
(74) *Attorney, Agent, or Firm* — Frank Lollo; Eversheds Sutherland (US) LLP

(57) ABSTRACT

The disclosure describes systems and methods for processing audio signals in a vehicle to perform sound source separation. The sound source separation is performed using transfer functions and involves separation of the speech of multiple occupants. The separated speech can be used to isolate and correctly respond to a command to control vehicle systems.

20 Claims, 5 Drawing Sheets

(56) References Cited

U.S. PATENT DOCUMENTS

| | | | |
|---|---|---|---|
| 2009/0086998 A1* | 4/2009 | Jeong | H04R 3/005 381/119 |
| 2012/0294446 A1* | 11/2012 | Visser | H04S 7/303 381/17 |
| 2013/0077776 A1* | 3/2013 | Ikram | H04M 9/082 379/406.01 |
| 2014/0278396 A1 | 9/2014 | Graumann | |
| 2014/0355776 A1* | 12/2014 | Park | G10L 21/0272 381/71.2 |
| 2015/0088497 A1* | 3/2015 | Gomez | G10L 21/0208 704/226 |
| 2015/0127338 A1* | 5/2015 | Reuter | H04R 3/005 704/233 |
| 2015/0172842 A1* | 6/2015 | Nakamura | H04R 29/004 381/92 |
| 2016/0189731 A1* | 6/2016 | Hennequin | G10L 21/0208 381/66 |
| 2018/0158467 A1* | 6/2018 | Suzuki | H04R 3/02 |
| 2019/0327557 A1* | 10/2019 | Moon | H04R 3/02 |

OTHER PUBLICATIONS

Lee, Blind Separation of Time delayed and Convolved Sources (Year: 1998).*

Sharon G., et al., "A Consolidated Perspective on Multi-Microphone Speech Enhancement and Source Separation", IEEE (2016), http://www.ieee.org/publications_standards/publications/rights/index.html (38 pages).

Search Report—www.anovip.com. (23 pages).

* cited by examiner

SYSTEMS AND METHODS FOR AUDIO PROCESSING

BACKGROUND

Voice commands are useful to control vehicle systems. However, if multiple occupants in a vehicle are talking at the same time, it may be difficult for a digital assistant or the like to interpret/understand a command that is issued by one of the occupants, which may result in an incorrect response or no response at all. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to process audio signals in a vehicle to perform sound source separation. The sound source separation is performed using transfer functions that can be measured beforehand. Sound source separation (SSS) involves separation of the speech of multiple occupants into the respective streams for each occupant. The separated speech can be used by a digital assistant or audio processing system to isolate and correctly respond to a command used to control the vehicle system.

Figure 1:
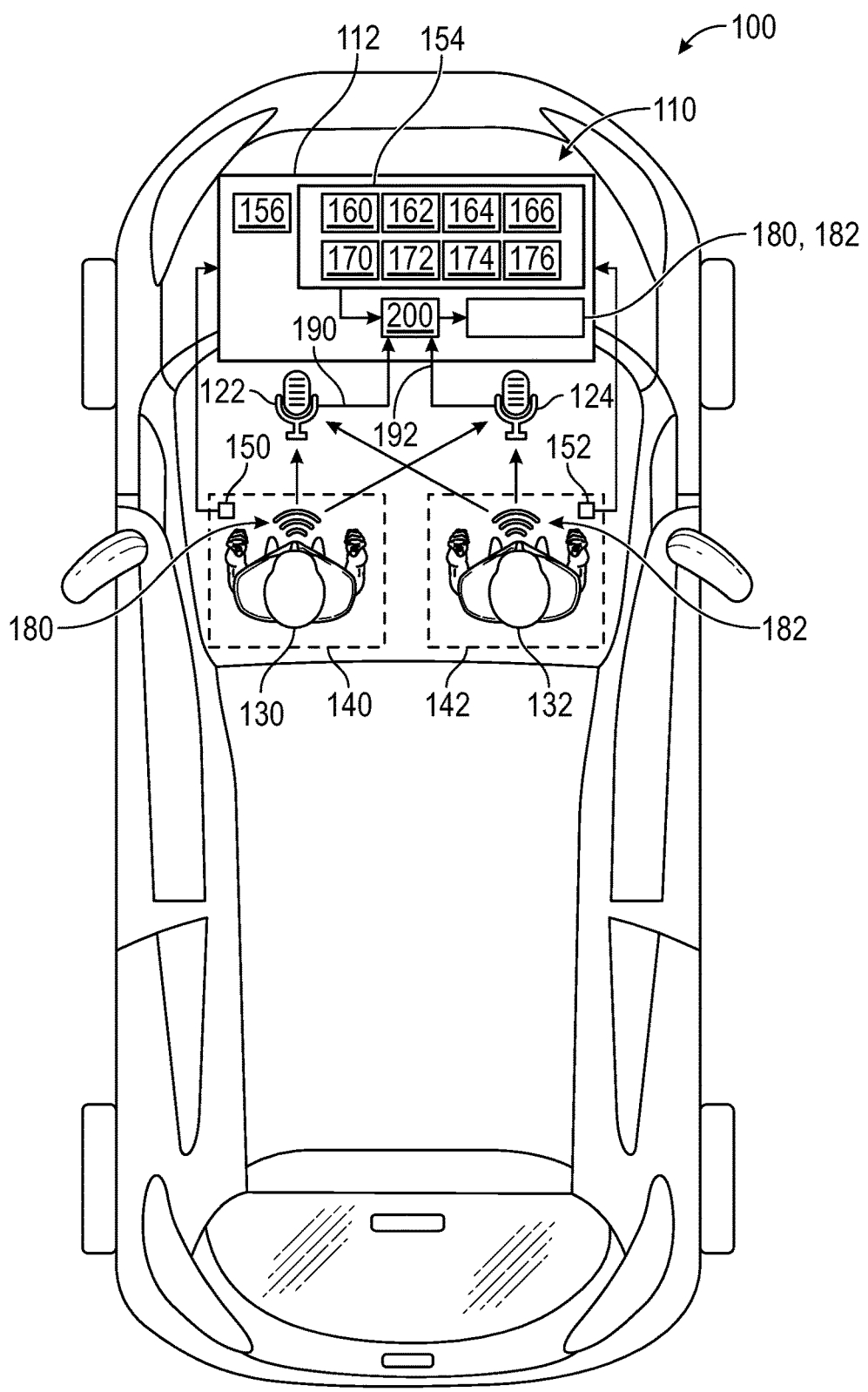
FIG. 1 depicts a vehicle with an audio processing system in accordance with the present disclosure.

Referring to FIG. 1, a vehicle 100 includes an audio processing system 110. The audio processing system 110 includes a vehicle computer 112 that controls the audio processing system 110. The audio processing system 110 includes a first microphone 120 (A) and a second microphone 122 (B), each of which are configured to pickup or measure audio from sources (e.g., first occupant 130 and second occupant 132) in each of a first location 140 (P) and a second location 142 (Q) inside the vehicle 100. In FIG. 1, the first location 140 (P) is closer to the first microphone 120 (A) and the second location 142 (Q) is closer to the second microphone 122 (B).

The audio processing system 110 includes sensors 150, 152 that determine when occupants 130, 132 are in the first location 140 (P) and/or the second location 142 (Q).

The vehicle computer 112 includes a memory 154 and a processor 156. The memory includes transfer functions 160, 162, 164, 166 ($TF_{P\ to\ A}$, $TF_{P\ to\ B}$, $TF_{Q\ to\ A}$, $TF_{Q\ to\ B}$). Each transfer function 160, 162, 164, 166 ($TF_{P\ to\ A}$, $TF_{P\ to\ B}$, $TF_{Q\ to\ A}$, $TF_{Q\ to\ B}$) represents a relationship between a signal produced at a location in the vehicle 100 (e.g., one of the locations 140, 142) and a signal received at a microphone (e.g., one of the microphones 120, 122). In particular, the transfer function reflects reverberations and/or absorptions that may take place as the sound travels from the speaker's mouth to the microphone inside the vehicle.

In the example of FIG. 1, the transfer functions 160, 162, 164, 166 ($TF_{P\ to\ A}$, $TF_{P\ to\ B}$, $TF_{Q\ to\ A}$, $TF_{Q\ to\ B}$) are determined for the locations 140, 142 (P, Q) and the microphones 120, 122 (A, B). The first transfer function 160 ($TF_{P\ to\ A}$) relates a first audio signal produced at the first location 140 (P) and a second audio signal received at the first microphone 120 (A). The second transfer function 162 ($TF_{P\ to\ B}$) relates a first audio signal produced at the first location 140 (P) and a second audio signal received at the second microphone 122 (B). The third transfer function 164 ($TF_{Q\ to\ A}$) relates a first audio signal produced at the second location 142 (Q) and a second audio signal received at the first microphone 120 (A). The fourth transfer function 166 ($TF_{Q\ to\ B}$) relates a first audio signal produced at the second location 142 (Q) and a second audio signal received at the second microphone 122 (B).

The audio processing system 110 determines the inverse transfer functions 170, 172, 174, 176 ($1/TF_{P\ to\ A}$, $1/TF_{P\ to\ B}$, $1/TF_{Q\ to\ A}$, $1/TF_{Q\ to\ B}$) from the transfer functions 160, 162, 164, 166 ($TF_{P\ to\ A}$, $TF_{P\ to\ B}$, $TF_{Q\ to\ A}$, $TF_{Q\ to\ B}$) and stores the inverse transfer functions 170, 172, 174, 176 ($1/TF_{P\ to\ A}$, $1/TF_{P\ to\ B}$, $1/TF_{Q\ to\ A}$, $1/TF_{Q\ to\ B}$) in the memory 154.

The audio processing system 110 is configured to measure a first combined audio signal 190 with the first microphone 120 (A) and a second combined audio signal 192 with the second microphone 122 (B). Each of the combined audio signals 190, 192 includes a first audio signal 180 ($Speech_P$) from the first occupant 130 at the first location 140 (P) and the second audio signal 182 ($Speech_Q$) from the second occupant 132 at the second location 142 (Q). The audio processing system 110 is configured to process the combined audio signals 190, 192 to separate the first audio signal 180 ($Speech_P$) from the second audio signal 182 ($Speech_Q$).

Figure 2:
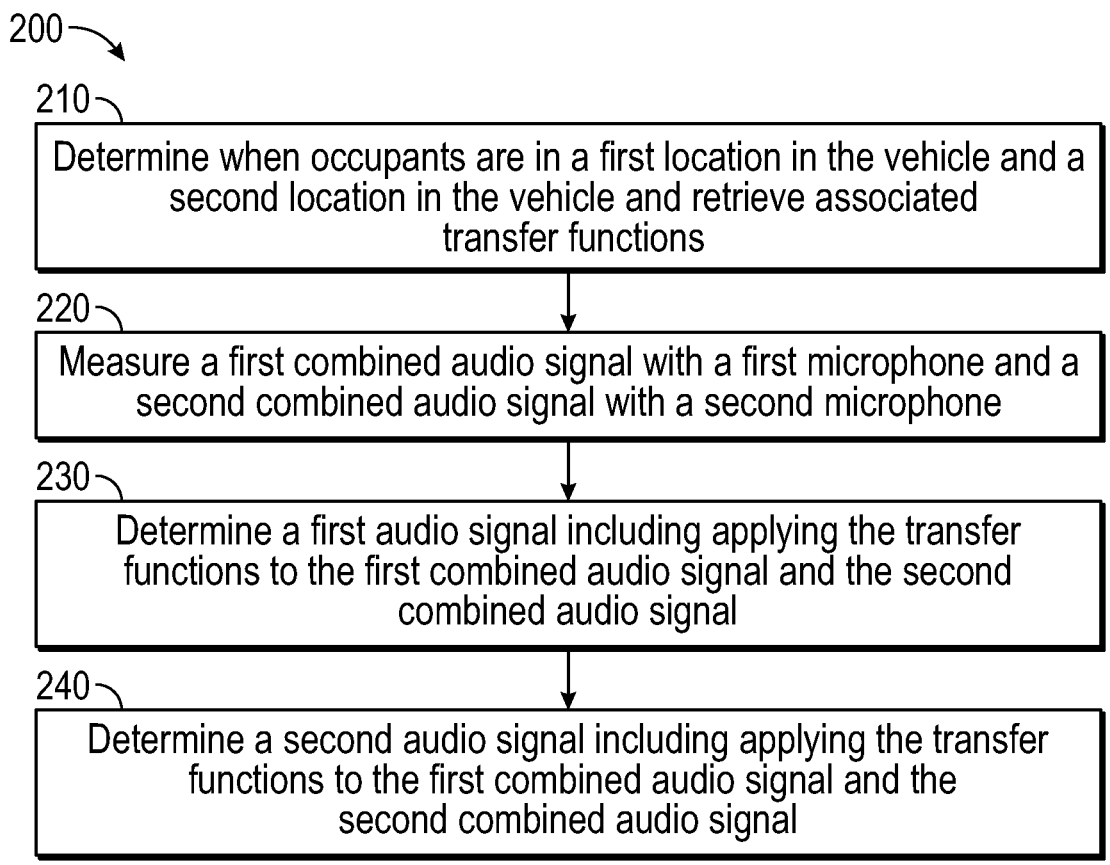
FIG. 2 is a flow chart of a method in accordance with the present disclosure.

Referring to FIG. 2, according to a first step 210 of an example method 200, the sensors 150, 152 determine when occupants (e.g., first occupant 130 and second occupant 132 in FIG. 1) are in the first location 140 (P) and the second location 142 (Q). In response to determining that occupants are in the first location 140 (P) and the second location 142 (Q), the audio processing system 110 retrieves transfer functions 160, 162 ($TF_{P\ to\ A}$, $TF_{P\ to\ B}$) and inverse transfer functions 170, 172 ($1/TF_{P\ to\ A}$, $1/TF_{P\ to\ B}$) for the first location 140 (P); and retrieves transfer functions 164, 166 ($TF_{Q\ to\ A}$, $TF_{Q\ to\ B}$) and inverse transfer functions 174, 176 ($1/TF_{Q\ to\ A}$, $1/TF_{Q\ to\ B}$) for the second location 142 (Q).

According to a second step 220, the audio processing system 110 measures a first combined audio signal 190 with the first microphone 120 (e.g., pickup at mic A in the equations below). Additionally, the audio processing system 110 measures a second combined audio signal 192 with the second microphone 122 (e.g., pickup at mic B in the equations below).

According to a third step 230, the audio processing system 110 processes the first combined audio signal 190 (Pickup at mic A) and the second combined audio signal 192 (Pickup at mic B) to obtain the first audio signal 180 ($Speech_P$) from the first occupant 130 at first location 140 (P). The audio processing system 110 applies the transfer functions 160, 162, 164, 166 ($TF_{P\ to\ A}$, $TF_{P\ to\ B}$, $TF_{Q\ to\ A}$, $TF_{Q\ to\ B}$) and inverse transfer functions 170, 172, 174, 176 ($1/TF_{P\ to\ A}$, $1/TF_{P\ to\ B}$, $1/TF_{Q\ to\ A}$, $1/TF_{Q\ to\ B}$) from the first step to the first combined audio signal 190 (Pickup at mic A) and the second combined audio signal 192 (Pickup at mic B) to obtain the first audio signal 180 ($Speech_P$). For example, the first audio signal 180 ($Speech_P$) is determined according to the following equations:

$$Speech_P=[\{(Pickup\ at\ mic\ A)\otimes 1/(TF_{Q\ to\ A})\}-\{(Pickup\ at\ mic\ B)\otimes 1/(TF_{Q\ to\ B})\}]\otimes(1/TF_{P\ Computed})$$

$$TF_{P\ Computed}=[\{TF_{P\ to\ A}\otimes 1/(TF_{Q\ to\ A})\}-\{TF_{P\ to\ B}\otimes 1/(TF_{Q\ to\ B})\}]$$

According to a fourth step 240, the audio processing system 110 processes the first combined audio signal 190 (Pickup at mic A) and the second combined audio signal 192 (Pickup at mic B) to obtain the second audio signal 182 ($Speech_Q$) from the second occupant 132 at the second location 142 (Q). The audio processing system 110 applies the transfer functions 160, 162, 164, 166 ($TF_{P\ to\ A}$, $TF_{P\ to\ B}$, $TF_{Q\ to\ A}$, $TF_{Q\ to\ B}$) and inverse transfer functions 170, 172, 174, 176 ($1/TF_{P\ to\ A}$, $1/TF_{P\ to\ B}$, $1/TF_{Q\ to\ A}$, $1/TF_{Q\ to\ B}$) from the first step to the first combined audio signal 190 (Pickup at mic A) and the second combined audio signal 192 (Pickup at mic B) to obtain the second audio signal 182 ($Speech_Q$). For example, the second audio signal 182 ($Speech_Q$) is determined according to the following equations:

$$Speech_Q=[\{(Pickup\ at\ mic\ A)\otimes 1/(TF_{P\ to\ A})\}-\{(Pickup\ at\ mic\ B)\otimes 1/(TF_{P\ to\ B})\}]\otimes(1/TF_{Q\ Computed})$$

$$TF_{Q\ Computed}=[\{TF_{Q\ to\ A}\otimes 1/(TF_{P\ to\ A})\}-\{TF_{Q\ to\ B}\otimes 1/(TF_{P\ to\ B})\}]$$

Separation transfer functions ($TF_{P\ Computed}$, $TF_{Q\ Computed}$) can be determined from the transfer functions 160, 162, 164, 166 ($TF_{P\ to\ A}$, $TF_{P\ to\ B}$, $TF_{Q\ to\ A}$, $TF_{Q\ to\ B}$) and the inverse transfer functions 170, 172, 174, 176 ($1/TF_{P\ to\ A}$, $1/TF_{P\ to\ B}$, $1/TF_{Q\ to\ A}$, $1/TF_{Q\ to\ B}$) retrieved in the first step. The inverse separation transfer functions ($1/TF_{P\ Computed}$, $1/TF_{Q\ Computed}$) can be determined from the separation transfer functions ($TF_{P\ Computed}$, $TF_{Q\ Computed}$). The separation transfer functions ($TF_{P\ Computed}$, $TF_{Q\ Computed}$) and the inverse separation transfer functions ($1/TF_{P\ Computed}$, $1/TF_{Q\ Computed}$) can be determined by the audio processing system 110 and stored in the memory 154 in the first step prior to measuring the first combined audio signal 190 (Pickup at mic A) with the first microphone 120 (A) and the second combined audio signal 192 (Pickup at mic B) with the second microphone 122 (B).

In other examples, the equations can be extrapolated for additional locations in the vehicle and additional microphones.

These and other advantages of the present disclosure are provided in greater detail herein.

Illustrative Embodiments

The disclosure will be described more fully hereinafter with reference to the accompanying drawings, in which embodiments of the disclosure are shown, and not intended to be limiting.

Referring to FIG. 1, the vehicle 100 may take the form of a passenger or commercial automobile such as, for example, a car, a truck, a sport utility, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 100 may be configured as an electric vehicle (EV). More particularly, the vehicle 100 may include a battery EV (BEV) drive system. The vehicle 100 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 100 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

The vehicle 100 may be a manually driven vehicle, and/or be configured to operate in a fully autonomous (e.g., driverless) mode (e.g., level 5 autonomy) or in one or more partial autonomy modes. Examples of partial autonomy modes are widely understood in the art as autonomy Levels 1 through 5.

The vehicle 100 includes the vehicle computer 112. The vehicle computer 112 may be or include an electronic vehicle controller. The vehicle computer 112 may be installed in an engine compartment of the vehicle 100 as schematically illustrated or elsewhere in the vehicle 100. The vehicle computer 112 includes the computer-readable memory 154 and one or more processor(s) 156.

The one or more processor(s) 156 may be disposed in communication with one or more memory devices disposed in communication with the respective computing systems (e.g., the memory 154 and/or one or more external databases). The processor(s) 156 may utilize the memory 154 to store programs in code and/or to store data for performing aspects of methods of the audio processing system 110 in accordance with the disclosure.

The memory 154 may be a non-transitory computer-readable memory storing program code. The memory 154 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

As described in further detail below, the vehicle computer 112 may, in some example embodiments, be disposed in communication with a mobile device and one or more server(s).

The vehicle computer 112 controls the audio processing system 110. The audio processing system 110 includes the first microphone 120 (A) and the second microphone 122 (B), each of which are configured to pick up or record audio signals from sources (e.g., the first occupant 130 and the second occupant 132) at the first location 140 (P) (e.g., driver's seat) and the second location 142 (Q) (e.g., the front passenger seat) inside the vehicle 100. In FIG. 1, the first location 140 (P) is closer to the first microphone 120 (A) and the second location 142 (Q) is closer to the second microphone 122 (B).

In other examples, the source locations may include different numbers of source locations and/or different source locations in the vehicle 100 such as rear passenger seats. Additionally, the microphones may include different numbers of microphones and/or different microphone locations in the vehicle 100.

The audio processing system 110 includes sensors 150, 152 that determine when occupants 130, 132 are in the first location 140 (P) and/or the second location 142 (Q). For example, the sensors 150, 152 may include weight sensors in the seats, cameras, microphones, proximity sensors, sensors that determine a location of a mobile device, combinations thereof, and the like.

The memory 154 includes transfer functions 160, 162, 164, 166 ($TF_{P\ to\ A}$, $TF_{P\ to\ B}$, $TF_{Q\ to\ A}$, $TF_{Q\ to\ B}$) and inverse transfer functions 170, 172, 174, 176 ($1/TF_{P\ to\ A}$, $1/TF_{P\ to\ B}$, $1/TF_{Q\ to\ A}$, $1/TF_{Q\ to\ B}$). Each transfer function 160, 162, 164, 166 ($TF_{P\ to\ A}$, $TF_{P\ to\ B}$, $TF_{Q\ to\ A}$, $TF_{Q\ to\ B}$) represents a relationship between a signal produced at a location in the vehicle 100 (e.g., one of the locations 140, 142 (P, Q)) and a signal received at a microphone (e.g., microphones 120, 122 (A,B)). In the example of FIG. 1, the transfer functions 160, 162, 164, 166 ($TF_{P\ to\ A}$, $TF_{P\ to\ B}$, $TF_{Q\ to\ A}$, $TF_{Q\ to\ B}$) are determined for the locations 140, 142 (P, Q) and the microphones 120, 122 (A, B). In various examples, the memory will store a transfer function for each combination of source location and microphone location.

In FIG. 1, the first transfer function 160 ($TF_{P\ to\ A}$) relates a first audio signal produced at the first location 140 (P) and a second audio signal received at the first microphone 120 (A). The second transfer function 162 ($TF_{P\ to\ B}$) relates a first audio signal produced at the first location 140 (P) and a second audio signal received at the second microphone 122 (B). The third transfer function 164 ($TF_{Q\ to\ A}$) relates a first audio signal produced at the second location 142 (Q) and a second audio signal received at the first microphone 120 (A). The fourth transfer function 166 ($TF_{Q\ to\ B}$) relates a first audio signal produced at the second location 142 (Q) and a second audio signal received at the second microphone 122 (B).

The audio processing system 110 determines the inverse transfer functions 170, 172, 174, 176 ($1/TF_{P\ to\ A}$, $1/TF_{P\ to\ B}$, $1/TF_{Q\ to\ A}$, $1/TF_{Q\ to\ B}$) from the transfer functions 160, 162, 164, 166 ($TF_{P\ to\ A}$, $TF_{P\ to\ B}$, $TF_{Q\ to\ A}$, $TF_{Q\ to\ B}$) and stores the inverse transfer functions 170, 172, 174, 176 ($1/TF_{P\ to\ A}$, $1/TF_{P\ to\ B}$, $1/TF_{Q\ to\ A}$, $1/TF_{Q\ to\ B}$) in the memory 154.

Figure 3:
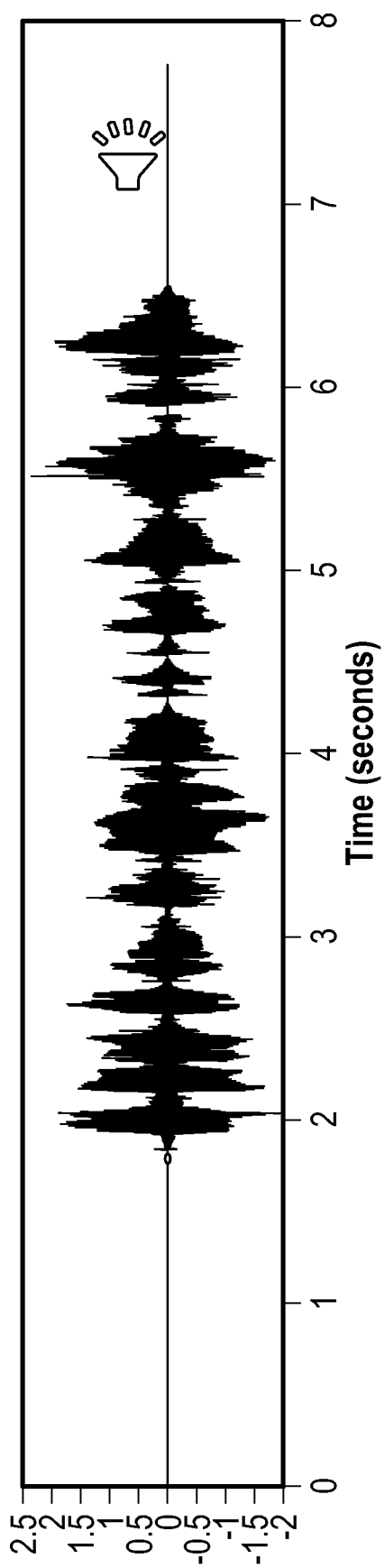
FIG. 3 depicts a source signal in accordance with the present disclosure.
Figure 4:
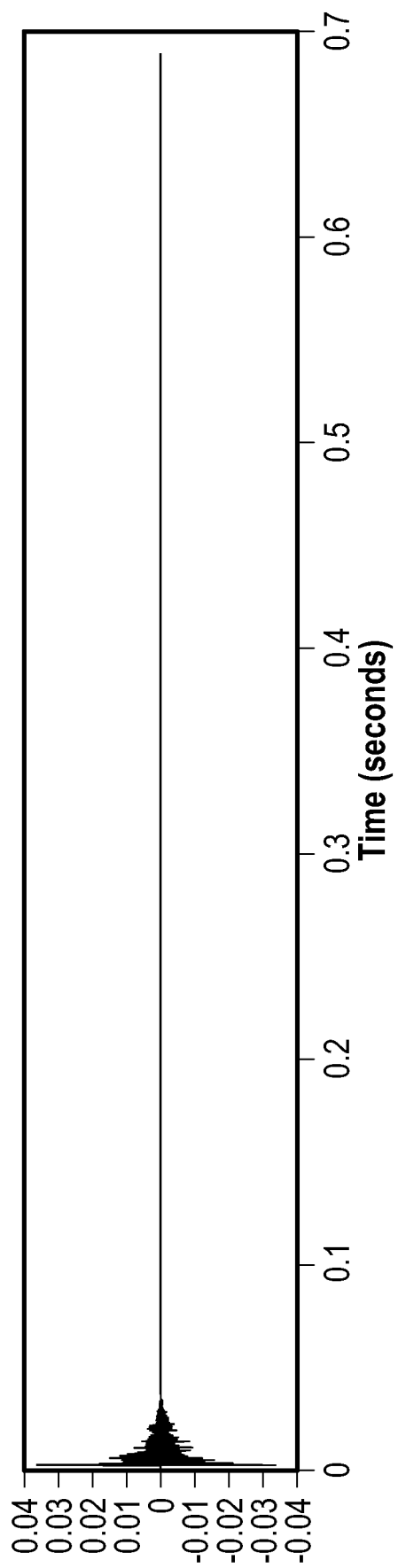
FIG. 4 depicts a transfer function in accordance with the present disclosure.
Figure 5:
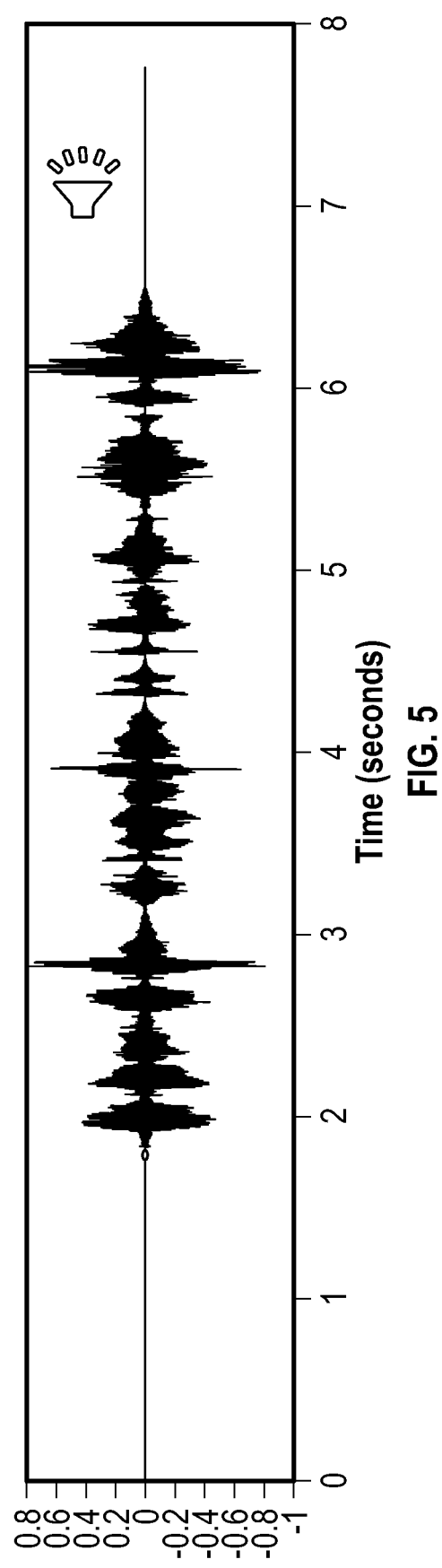
FIG. 5 depicts a pickup at a microphone in accordance with the present disclosure.

FIGS. 3-5 are provided to illustrate a transfer function that relates a first audio signal produced at a location in the vehicle and a second audio signal received at a microphone in the vehicle. Referring to FIG. 3, an example source signal 300 (e.g., a first audio signal from an occupant or speaker) is shown. Referring to FIG. 4, an example transfer function 400 is shown that is based on the location in the vehicle and the microphone. In FIG. 5, an example microphone pickup 500 (e.g., a second audio signal) is shown. Here, the microphone pickup 500 represents both the measurement by the microphone and a convolution of the source signal 300 and the transfer function 400. Accordingly, the transfer function 400 relates the example source signal 300 (e.g., first audio signal) to the microphone pickup 500 (e.g., second audio signal).

The second audio signal (e.g., the microphone pickup 500) is different from the first audio signal (e.g., the source signal 300) because of the reverberation and absorption of the vehicle cabin. The vehicle cabin reflects and/or attenuates the first audio signal and the first audio signal also attenuates based on the distance between the source location and the microphone location. The transfer function accounts for these differences. Accordingly, transfer functions and vary from location to location in a vehicle.

The equations below illustrate transfer functions that relate a first audio signal (e.g., a source signal) produced at one of the locations 140, 142 (P, Q) to a second audio signal 500 (e.g., Pickup at a microphone (mic)) that is received at one of the microphones 120, 122 (A, B). In these equations, each pickup at a microphone is for a single source signal although in equations discussed later the pickup at a microphone includes multiple source signals that are then processed to separate the source signals and to isolate a source signal.

Pickup at first mic A=source signal at first location $P \otimes TF_{P\ to\ A}$

Pickup at second mic B=source signal at first location $P \otimes TF_{P\ to\ B}$ Pickup at first mic A=source signal at second location $Q \otimes TF_{Q\ to\ A}$ Pickup at second mic B=source signal at second location $Q \otimes TF_{Q\ to\ B}$ In the equations above, convolution (e.g., as represented by $\otimes$) of a source signal with a transfer function gives the pickup at a microphone. Convolution is a mathematical operation where the shape of one function is modified by the other. Particularly, convolution is the integral of the product of the two functions after one is reversed and shifted. The integral is evaluated for all values of shift. The convolution of two signals f(t) and g(t) can be given by the convolution integral:

$$(f \otimes g)(t) = \int_{-\infty}^{\infty} f(\tau)g(t-\tau)d\tau$$

where signal f is an input signal (e.g., the speech from an occupant or a source signal) and signal g is a weighting function (e.g., the transfer function or an impulse response). The transfer function weights the speech according to the reverberant and absorptive effects of the vehicle cabin and the distance from the occupant's mouth to the microphone.

The transfer function may be determined using a unit impulse for the signal f. If the signal f is a unit impulse the result of the convolution integral is the transfer function g as shown below:

$$\int_{-\infty}^{\infty} \delta(\tau)g(t-\tau)d\tau = g(t)$$

The microphones 120, 122 (A, B) are configured to measure combined audio signals 190, 192, respectively, where the microphone pickup or received signal includes input signals from more than one source. First microphone 120 (A) measures a first combined audio signal 190 (e.g., pickup at mic A in the equations below) and second microphone 122 (B) measures a second combined audio signal 192 (e.g., pickup at mic B in the equations below). Each of the combined audio signals 190, 192 includes a first audio signal 180 (e.g., Speech$_P$ in the equations below) from the first occupant 130 at the first location 140 (P) and a second audio signal 182 (Speech$_Q$ in the equations below) from the second occupant 132 at the second location 142 (Q). Using the transfer functions 160, 162, 164, 166 (TF$_{P\ to\ A}$, TF$_{P\ to\ B}$, TF$_{Q\ to\ A}$, TF$_{Q\ to\ B}$) determined above, the combined audio signals 190, 192 can be given as:

$$\text{Pickup at mic } A = \text{Speech}_P \otimes \text{TF}_{P\ to\ A} + \text{Speech}_Q \otimes \text{TF}_{Q\ to\ A} \quad (1)$$

$$\text{Pickup at mic } B = \text{Speech}_P \otimes \text{TF}_{P\ to\ B} + \text{Speech}_Q \otimes \text{TF}_{Q\ to\ B} \quad (2)$$

The audio processing system 110 is configured to separate the first audio signal 180 (Speech$_P$) from the second audio signal 182 (Speech$_Q$) using the measured combined audio signals 190, 192 (Pickup at mics A, B), the transfer functions 160, 162, 164, 166 (TF$_{P\ to\ A}$, TF$_{P\ to\ B}$, TF$_{Q\ to\ A}$, TF$_{Q\ to\ B}$), and the inverse transfer functions 170, 172, 174, 176 (1/TF$_{P\ to\ A}$, 1/TF$_{P\ to\ B}$, 1/TF$_{Q\ to\ A}$, 1/TF$_{Q\ to\ B}$).

A method for isolating the first audio signal 180 (Speech$_P$) is now discussed.

In the time domain, the convolution of a transfer function with its inverse removes the transfer function Similarly, in the Fourier domain, the convolution operator becomes a multiplication of signals and applying an inverse transfer function to a transfer function similarly removes the transfer function.

By applying the inverse third transfer function 174 (1/TF$_{Q\ to\ A}$) to equation (1), the third transfer function 164 (TF$_{Q\ to\ A}$) is removed from the second audio signal 182 (Speech$_Q$) as shown in equation (3) below. By applying the inverse fourth transfer function 176 (1/TF$_{Q\ to\ B}$) to equation (2), the fourth transfer function 166 (TF$_{Q\ to\ B}$) is removed from the second audio signal 182 (Speech$_Q$) as shown in equation (4) below.

$$(\text{Pickup at mic } A) \otimes 1/(\text{TF}_{Q\ to\ A}) = \text{Speech}_P \otimes \text{TF}_{P\ to\ A} \otimes 1/(\text{TF}_{Q\ to\ A}) + \text{Speech}_Q \quad (3)$$

$$(\text{Pickup at mic } B) \otimes 1/(\text{TF}_{Q\ to\ B}) = \text{Speech}_P \otimes \text{TF}_{P\ to\ B} \otimes 1/(\text{TF}_{Q\ to\ B}) + \text{Speech}_Q \quad (4)$$

Subtracting equation (4) from equation (3) gives equation (5) with second audio signal 182 (Speech$_Q$) removed and with first audio signal 180 (Speech$_P$) modified by a transfer function that is, for simplicity, referred to as a first separation transfer function TF$_{P\ Computed}$ in equation (6).

$$\{(\text{Pickup at mic } A) \otimes 1/(\text{TF}_{Q\ to\ A})\} - \{(\text{Pickup at mic } B) \otimes 1/(\text{TF}_{Q\ to\ B})\} = \text{Speech}_P \otimes [\{\text{TF}_{P\ to\ A} \otimes 1/(\text{TF}_{Q\ to\ A})\} - \{\text{TF}_{P\ to\ B} \otimes 1/(\text{TF}_{Q\ to\ B})\}] \quad (5)$$

$$\text{TF}_{P\ Computed} = [\{\text{TF}_{P\ to\ A} \otimes 1/(\text{TF}_{Q\ to\ A})\} - \{\text{TF}_{P\ to\ B} \otimes 1/(\text{TF}_{Q\ to\ B})\}] \quad (6)$$

The first separation transfer function TF$_{P\ Computed}$ is made up of the first transfer function 160 (TF$_{P\ to\ A}$), the second transfer function 162 (TF$_{P\ to\ B}$), the inverse third transfer function 174 (1/TF$_{Q\ to\ A}$) and the inverse fourth transfer function 176 (1/TF$_{Q\ to\ B}$), which are already known. Applying the inverse first separation transfer function 1/TF$_{P\ Computed}$ to equation (5), the first audio signal 180 (Speech$_P$) can be obtained as shown in equation (7).

$$\text{Speech}_P = [\{(\text{Pickup at mic } A) \otimes 1/(\text{TF}_{Q\ to\ A})\} - \{(\text{Pickup at mic } B) \otimes 1/(\text{TF}_{Q\ to\ B})\}] \otimes (1/\text{TF}_{P\ Computed}) \quad (7)$$

The second audio signal 182 (Speech$_Q$) can be isolated according to a similar method. By applying inverse first transfer function 170 (1/TF$_{P\ to\ A}$) to equation (1), the first transfer function (TF$_{P\ to\ A}$) is removed from the first audio signal 180 (Speech$_P$) as shown in equation (8) below. By applying the inverse second transfer function 172 (1/TF$_{P\ to\ B}$) to equation (2), the second transfer function 162 (TF$_{P\ to\ B}$) can be removed from the first audio signal 180 (Speech$_P$) as shown in equation (9) below.

$$(\text{Pickup at mic } A) \otimes 1/(\text{TF}_{P\ to\ A}) = \text{Speech}_P + \text{Speech}_Q \otimes \text{TF}_{Q\ to\ A} \otimes 1/(\text{TF}_{P\ to\ A}) \quad (8)$$

$$(\text{Pickup at mic } B) \otimes 1/(\text{TF}_{P\ to\ B}) = \text{Speech}_P + \text{Speech}_Q \otimes \text{TF}_{Q\ to\ B} \otimes 1/(\text{TF}_{P\ to\ B}) \quad (9)$$

Subtracting equation (9) from equation (8) gives equation (10) with the first audio signal 180 (Speech$_P$) removed and the second audio signal 182 (Speech$_Q$) modified by a transfer function that is, for simplicity, referred to as a second separation transfer function (TF$_{Q\ Computed}$) in equation (11).

$$\{(\text{Pickup at mic } A) \otimes 1/(\text{TF}_{P\ to\ A})\} - \{(\text{Pickup at mic } B) \otimes 1/(\text{TF}_{P\ to\ B})\} = \text{Speech}_Q \otimes [\{\text{TF}_{Q\ to\ A} \otimes 1/(\text{TF}_{P\ to\ A})\} - \{\text{TF}_{Q\ to\ B} \otimes 1/(\text{TF}_{P\ to\ B})\}] \quad (10)$$

$$\text{TF}_{Q\ Computed} = [\{\text{TF}_{Q\ to\ A} \otimes 1/(\text{TF}_{P\ to\ A})\} - \{\text{TF}_{Q\ to\ B} \otimes 1/(\text{TF}_{P\ to\ B})\}] \quad (11)$$

The second separation transfer function (TF$_{Q\ Computed}$) is made up of the third transfer function 164 (TF$_{Q\ to\ A}$), the fourth transfer function 166 (TF$_{Q\ to\ B}$), the inverse first transfer function 170 (1/TF$_{P\ to\ A}$) and the inverse second transfer function 172 (1/TF$_{P\ to\ B}$), which are already known. Applying the inverse second separation transfer function (1/TF$_{Q\ Computed}$) to equation (10), the second audio signal 182 (Speech$_Q$) can be obtained as shown in equation (12).

$$\text{Speech}_Q = [\{(\text{Pickup at mic } A) \otimes 1/(\text{TF}_{P\ to\ A})\} - \{(\text{Pickup at mic } B) \otimes 1/(\text{TF}_{P\ to\ B})\}] \otimes (1/\text{TF}_{Q\ Computed}) \quad (12)$$

According to the first step 210 of the example method 200, the sensors 150, 152 determine when occupants (e.g., first occupant 130 and second occupant 132 in FIG. 1) are in the first location 140 (P) and the second location 142 (Q). In response to determining occupants are in the first location 140 (P) and the second location 142 (Q), the audio processing system 110 retrieves transfer functions 160, 162 (TF$_{P\ to\ A}$, TF$_{P\ to\ B}$) and inverse transfer functions 170, 172 (1/TF$_{P\ to\ A}$, 1/TF$_{P\ to\ B}$) for the first location 140 (P); and retrieves transfer functions 164, 166 (TF$_{Q\ to\ A}$, TF$_{Q\ to\ B}$) and inverse transfer functions 174, 176 (1/TF$_{Q\ to\ A}$, 1/TF$_{Q\ to\ B}$) for the second location 142 (Q).

According to a second step 220, the audio processing system 110 measures a first combined audio signal 190 with the first microphone 120 (A) (e.g., pickup at mic A in the equations above). Additionally, the audio processing system 110 measures a second combined audio signal 192 with the second microphone 122 (B) (e.g., pickup at mic B in the equations above).

According to a third step 230, the audio processing system 110 processes the first combined audio signal 190 and the second combined audio signal 192 to obtain the first audio signal 180 (Speech$_P$) from the first occupant 130 at the first location 140 (P). The audio processing system 110 applies the transfer functions 160, 162, 164, 166 (TF$_{P\ to\ A}$, TF$_{P\ to\ B}$, TF$_{Q\ to\ A}$, TF$_{Q\ to\ B}$) and the inverse transfer functions 170, 172, 174, 176 (1/TF$_{P\ to\ A}$, 1/TF$_{P\ to\ B}$, 1/TF$_{Q\ to\ A}$, 1/TF$_{Q\ to\ B}$) from the first step 210 to the first combined audio signal 190 and the second combined audio signal 192 to obtain the first audio signal 180 (Speech$_P$). For example, the transfer functions 160, 162, 164, 166 (TF$_{P\ to\ A}$, TF$_{P\ to\ B}$, TF$_{Q\ to\ A}$, TF$_{Q\ to\ B}$) and the inverse transfer functions 170, 172, 174, 176 (1/TF$_{P\ to\ A}$, 1/TF$_{P\ to\ B}$, 1/TF$_{Q\ to\ A}$, 1/TF$_{Q\ to\ B}$) are applied to the first combined audio signal 190 and the second combined audio signal 192 to obtain the first audio signal 180 (Speech$_P$) according to equation (7).

According to a fourth step 240, the audio processing system 110 processes the first combined audio signal 190 and the second combined audio signal 192 to obtain the second audio signal 182 (Speech$_Q$) from the second occupant 132 at the second location 142 (Q). The audio processing system 110 applies the transfer functions 160, 162, 164, 166 (TF$_{P\ to\ A}$, TF$_{P\ to\ B}$, TF$_{Q\ to\ A}$, TF$_{Q\ to\ B}$) and the inverse transfer functions 170, 172, 174, 176 (1/TF$_{P\ to\ A}$, 1/TF$_{P\ to\ B}$, 1/TF$_{Q\ to\ A}$, 1/TF$_{Q\ to\ B}$) from the first step 210 to the first combined audio signal 190 and the second combined audio signal 192 to obtain the second audio signal 182 (Speech$_Q$). For example, the transfer functions 160, 162, 164, 166 (TF$_{P\ to\ A}$, TF$_{P\ to\ B}$, TF$_{Q\ to\ A}$, TF$_{Q\ to\ B}$) and the inverse transfer functions 170, 172, 174, 176 (1/TF$_{P\ to\ A}$, 1/TF$_{P\ to\ B}$, 1/TF$_{Q\ to\ A}$, 1/TF$_{Q\ to\ B}$) are applied to the first combined audio signal 190 and the second combined audio signal 192 to obtain the second audio signal 182 (SpeechQ) according to equation (12).

Figure 6:
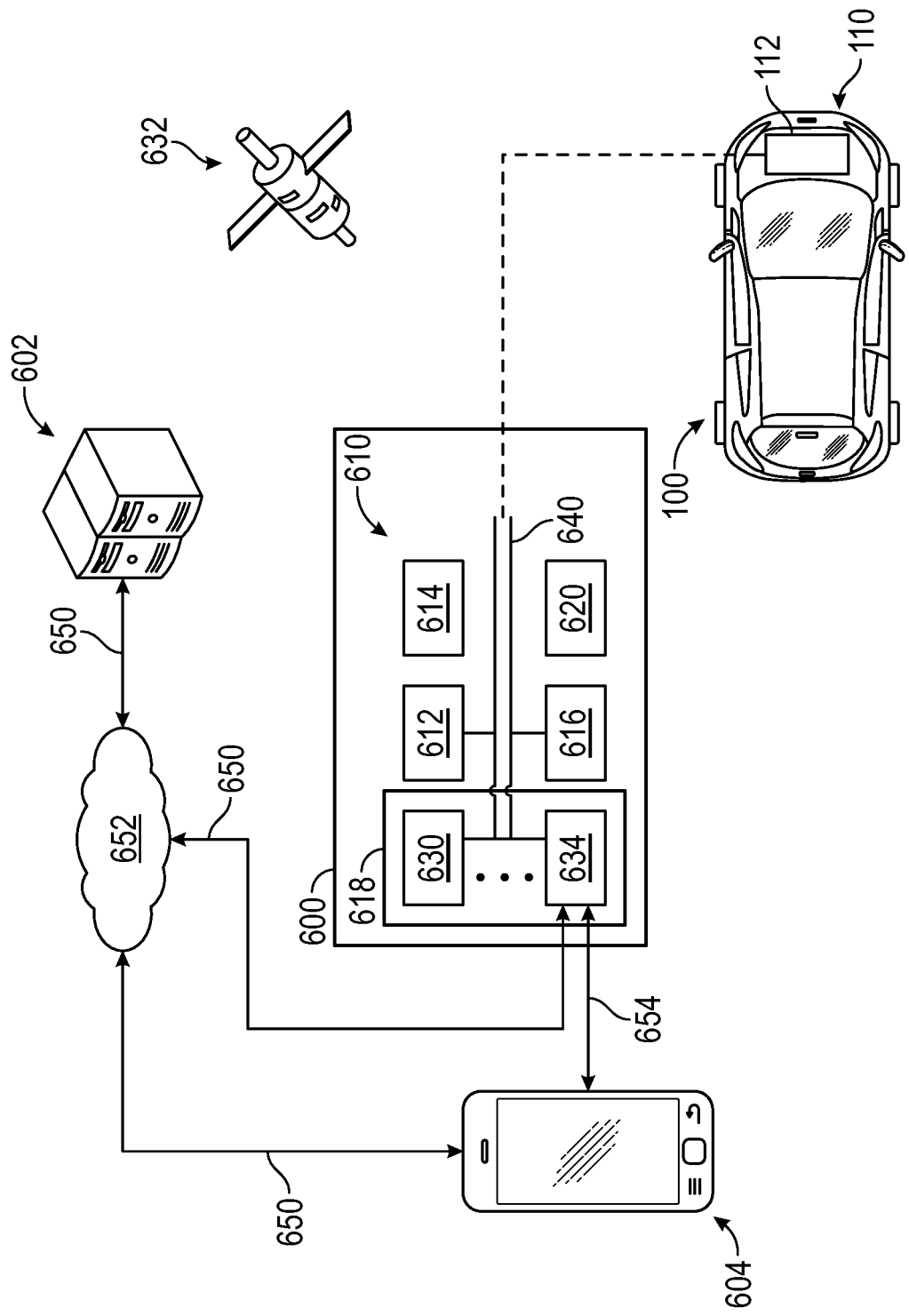
FIG. 6 depicts a vehicle and an example functional schematic of vehicle systems in accordance with the present disclosure.

Referring to FIG. 6, vehicle systems are described in greater detail. The vehicle 100 includes a Vehicle Controls Unit (VCU) 600. The VCU 600 includes a plurality of electronic control units (ECUs) 610 disposed in communication with the vehicle computer 112.

The VCU 600 may coordinate the data between vehicle systems, connected servers (e.g., the server(s) 602), a mobile device 604, and other vehicles operating as part of a vehicle fleet. The VCU 600 can include or communicate with any combination of the ECUs 610, such as, for example, a Body Control Module (BCM) 612, an Engine Control Module (ECM) 614, a Transmission Control Module (TCM) 616, a Telematics Control Unit (TCU) 618, a Restraint Control Module (RCM) 620, and the like.

The VCU 600 may control aspects of the vehicle 100, and implement one or more instruction sets received from a vehicle system controller (such as the audio processing system 110).

The TCU 618 can be configured to provide vehicle connectivity to wireless computing systems onboard and offboard the vehicle 100 and is configurable for wireless communication between the vehicle 100 and other systems, computers, and modules. For example, the TCU 618 includes a Navigation (NAV) system 630 for receiving and processing a GPS signal from a GPS 632, a Bluetooth® Low-Energy Module (BLEM) 634, a Wi-Fi transceiver, an Ultra-Wide Band (UWB) transceiver, and/or other wireless transceivers.

The NAV system 630 may be configured and/or programmed to determine a position of the vehicle 100. The NAV system 630 may include a Global Positioning System (GPS) receiver configured or programmed to triangulate the position of the vehicle 100 relative to satellites or terrestrial based transmitter towers associated with the GPS 632. The NAV system 630, therefore, may be configured or programmed for wireless communication.

The NAV system 630 may be further configured or programmed to develop routes from a current location to a selected destination, as well as display a map and present driving directions to the selected destination via, e.g., a user interface. In some instances, the NAV system 630 may develop the route according to a user preference. Examples of user preferences may include maximizing fuel efficiency, reducing travel time, traveling the shortest distance, or the like.

The TCU 618 generally includes wireless transmission and communication hardware that may be disposed in communication with one or more transceivers associated with telecommunications towers and other wireless telecommunications infrastructure. For example, the BLEM 634 may be configured and/or programmed to receive messages from, and transmit messages to, one or more cellular towers associated with a telecommunication provider, and/or and a Telematics Service Delivery Network (SDN) associated with the vehicle 100 for coordinating vehicle fleet.

The TCU 618 may be disposed in communication with the ECUs 610 by way of a Controller Area Network (CAN) bus 640. In some aspects, the TCU 618 may retrieve data and send data as a CAN bus 640 node.

The BLEM 634 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 634 may include Generic Attribute Profile (GATT) device connectivity for client devices that respond to or initiate GATT commands and requests, and connect directly with the mobile device 604.

The CAN bus 640 may be configured as a multi-master serial bus standard for connecting two or more of the ECUs 610 as nodes using a message-based protocol that can be configured and/or programmed to allow the ECUs 610 to communicate with each other. The CAN bus 640 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 610 may communicate with a host computer (e.g., the vehicle computer 112, the audio processing system 110, and/or the server(s) 602, etc.), and may also communicate with one another without the necessity of a host computer.

The CAN bus 640 may connect the ECUs 610 with the vehicle computer 112 such that the vehicle computer 112 may retrieve information from, send information to, and otherwise interact with the ECUs 610 to perform steps described according to embodiments of the present disclosure. The CAN bus 640 may connect CAN bus nodes (e.g., the ECUs 610) to each other through a two-wire bus, which may be a twisted pair having a nominal characteristic impedance. The CAN bus 640 may also be accomplished using other communication protocol solutions, such as Media Oriented Systems Transport (MOST) or Ethernet. In other aspects, the CAN bus 640 may be a wireless intra-vehicle CAN bus.

The VCU 600 may control various loads directly via the CAN bus 640 communication or implement such control in conjunction with the BCM 612. The ECUs 610 described with respect to the VCU 600 are provided for exemplary purposes only, and are not intended to be limiting or exclusive. Control and/or communication with other control modules is possible, and such control is contemplated.

The ECUs 610 may control aspects of vehicle operation and communication using inputs from human drivers, inputs from the audio processing system 110, the vehicle control system, and/or via wireless signal inputs received via wireless channel(s) 650 from other connected devices such as a mobile device 604, among others. The ECUs 610, when configured as nodes in the CAN bus 640, may each include a central processing unit (CPU), a CAN controller, and/or a transceiver. For example, although the mobile device 604 is depicted in FIG. 6 as connecting to the vehicle 100 via the BLEM 634, it is contemplated that the wireless connection may also or alternatively be established between the mobile device 604 and one or more of the ECUs 610 via the respective transceiver(s) associated with the module(s).

The BCM 612 generally includes an integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 612 may also operate as a gateway for bus and network interfaces to interact with remote ECUs.

The BCM 612 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc. The BCM 612 may be configured for vehicle energy management, exterior lighting control, wiper functionality, power window and door functionality, heating ventilation and air conditioning systems, and driver integration systems. In other aspects, the BCM 612 may control auxiliary equipment functionality, and/or is responsible for integration of such functionality. In one aspect, a vehicle having a vehicle control system may integrate the system using, at least in part, the BCM 612.

The mobile device 604 may connect with the vehicle computer 112 using wired and/or wireless communication protocols and transceivers. The mobile device 604 may be communicatively coupled with the vehicle 100 via one or more network(s) 652, which may communicate via one or more wireless channel(s) 650, and/or may connect with the vehicle 100 directly using near field communication (NFC) protocols, Bluetooth® protocols, Wi-Fi, Ultra-Wide Band (UWB), and other possible data connection and sharing techniques. The vehicle 100 may also receive and/or be in communication with the Global Positioning System (GPS) 632.

In some aspects, the mobile device 604 may communicate with the vehicle 100 through the one or more wireless channel(s) 650, which may be encrypted and established between the mobile device 604 and the Telematics Control Unit (TCU) 618. The mobile device 604 may communicate with the TCU 618 using a wireless transmitter associated with the TCU 618 on the vehicle 100. The transmitter may communicate with the mobile device 604 using a wireless communication network such as, for example, the one or more network(s) 652. The wireless channel(s) 650 are depicted in FIG. 6 as communicating via the one or more network(s) 652, and also via direct communication (e.g., channel 654) with the vehicle 100.

The network(s) 652 illustrate an example of an example communication infrastructure in which the connected devices discussed in various embodiments of this disclosure may communicate. The network(s) 652 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. An audio processing system, comprising:
a first microphone and a second microphone;
a computer, comprising:
  a processor; and
  a memory comprising computer executable instructions that, when executed by the processor, cause the processor to determine a first audio signal originating from a first source at a first location in a vehicle, comprising:
    measuring a first combined audio signal with the first microphone and a second combined audio signal with the second microphone, each of the first combined audio signal and the second combined audio signal including a first audio signal originating from a first source at the first location and a second audio signal originating from a second source at a second location in the vehicle;
    determining a third combined audio signal according to:
  Third combined audio signal={(first combined audio signal)⊗1/($TF_3$)}−{(second combined audio signal)⊗1/($TF_4$)]; and
    determining the first audio signal according to:
  First audio signal=[third combined audio signal]⊗(1/$TF_{1\ Computed}$),
    wherein $TF_{1\ Computed}$ is a first computed transfer function that is determined according to:
    $TF_{1\ Computed}$=[{$TF_1$⊗1/($TF_3$)}−{$TF_2$⊗1/($TF_4$)}]
    wherein $TF_1$ is a first transfer function between the first location and the first microphone;
    wherein $TF_2$ is a second transfer function between the first location and the second microphone;
    wherein $TF_3$ is a third transfer function between the second location and the first microphone; and
    wherein $TF_4$ is a fourth transfer function between the second location and the second microphone.

2. The audio processing system of claim 1, comprising at least one sensor and computer executable instructions that, when executed by the processor, cause the processor to determine a presence of the first source at the first location and a presence of the second source at the second location based on a measurement of the at least one sensor.

3. The audio processing system of claim 2, comprising computer executable instructions that, when executed by the processor, cause the processor to select the first transfer function, the second transfer function, the third transfer function, and the fourth transfer function for use in response to determining the presence of the first source at the first location and the presence of the second source at the second location.

4. The audio processing system of claim 1, wherein the first microphone and the second microphone are at different locations in the vehicle.

5. The audio processing system of claim 1, wherein each of the first transfer function and the second transfer function are determined using an impulse function from a source at the first location; and where each of the third transfer function and the fourth transfer function are determined using an impulse function from a source at the second location.

6. The audio processing system of claim 1, wherein each of the transfer functions reflects a reverberation and absorption of the vehicle between a respective location in the vehicle and a respective microphone.

7. The audio processing system of claim 1, comprising computer executable instructions that, when executed by the processor, cause the processor to control at least one vehicle system based on the first audio signal.

8. The audio processing system of claim 1, comprising computer executable instructions that, when executed by the processor, cause the processor to determine the second audio signal according to:
Second audio signal=[{(first combined audio signal)⊗1/($TF_1$)}−
{(second combined audio signal)⊗1/($TF_2$)}]⊗(1/$TF_{2\ Computed}$)
  wherein $TF_{2\ Computed}$ is a second computed transfer function that is determined according to:
  $TF_{2\ Computed}$=[{$TF_1$⊗1/($TF_2$)}−{$TF_3$⊗1/($TF_4$)}].

9. The audio processing system of claim 8, comprising computer executable instructions that, when executed by the processor, cause the processor to control at least one vehicle system based on the second audio signal.

10. A method, comprising:
measuring a first combined audio signal with a first microphone and a second combined audio signal with a second microphone, each of the first combined audio signal and the second combined audio signal including a first audio signal originating from a first source at a first location in a vehicle and a second audio signal originating from a second source at a second location in the vehicle;
determining a third combined audio signal according to:
Third combined audio signal={(first combined audio signal)⊗1/($TF_3$)}−
{(second combined audio signal)⊗1/($TF_4$)]; and
determining the first audio signal according to:
Third combined audio signal={(first combined audio signal)⊗1/($TF_3$)}−
{(second combined audio signal)⊗1/($TF_4$)]; and
determining the first audio signal according to:
First audio signal=[third combined audio signal]⊗(1/$TF_{1\ Computed}$),
  wherein $TF_{1\ Computed}$ is a first computed transfer function that is determined according to:
  $TF_{1\ Computed}$=[{$TF_1$⊗1/($TF_3$)}−{$TF_2$⊗1/($TF_4$)}]
  wherein $TF_1$ is a first transfer function between the first location and the first microphone;
  wherein $TF_2$ is a second transfer function between the first location and the second microphone;
  wherein $TF_3$ is a third transfer function between the second location and the first microphone; and
  wherein $TF_4$ is a fourth transfer function between the second location and the second microphone.

11. The method of claim 10, comprising determining a presence of the first source at the first location and determining a presence of the second source at the second location based on a measurement of at least one sensor.

12. The method of claim 11, comprising selecting the first transfer function, the second transfer function, the third transfer function, and the fourth transfer function for determining the first audio signal in response to determining the presence of the first source at the first location and the presence of the second source at the second location.

13. The method of claim 10, wherein the first microphone and the second microphone are at different locations in the vehicle.

14. The method of claim 10, comprising determining each of the first transfer function and the second transfer function using an impulse function from a source at the first location; and determining each of the third transfer function and the fourth transfer function using an impulse function from a source at the second location.

15. The method of claim 10, wherein each of the transfer functions reflects a reverberation and absorption of the vehicle between a respective location in the vehicle and a respective microphone.

16. The method of claim 10, comprising controlling at least one vehicle system based on the first audio signal.

17. The method of claim 10, comprising determining the second audio signal according to:

Second audio signal=$[\{$(first combined audio signal)$\otimes 1/(TF_1)\}-\{$(second combined audio signal)$\otimes 1/(TF_2)\}]\otimes(1/TF_{2\ Computed})$ wherein $TF_{2\ Computed}$ is a second computed transfer function that is determined according to:

$TF_{2\ Computed}=[\{TF_1\otimes 1/(TF_2)\}-\{TF_3\otimes 1/(TF_4)\}]$.

18. The method of claim 17, comprising controlling at least one vehicle system based on the second audio signal.

19. A vehicle, comprising:
an audio processing system, comprising:
a first microphone and a second microphone;
a vehicle computer, comprising:
a processor; and
a memory, comprising:
a first transfer function between a first location in the vehicle and the first microphone;
a second transfer function between the first location and the second microphone;
a third transfer function between a second location in the vehicle and the first microphone;
a fourth transfer function between the second location and the second microphone;
computer executable instructions that, when executed by the processor, cause the processor to determine a first audio signal originating from a first source at the first location, comprising:
measuring a first combined audio signal with the first microphone and a second combined audio signal with the second microphone, each of the first combined audio signal and the second combined audio signal including a first audio signal originating from a first source at the first location and a second audio signal originating from a second source at the second location;
determining a third combined audio signal, comprising:
determining a first convoluted signal as the convolution of the first combined audio signal and the inverse of the third transfer function;
determining a second convoluted signal as the convolution of the second combined audio signal and the inverse of the fourth transfer function; and
subtracting the second convoluted signal from the first convoluted signal;
determining the first audio signal as the convolution of the third combined audio signal and the inverse of a first computed transfer function, wherein the first computed transfer function is determined by:
determining a first combined transfer function as the convolution of the first transfer function and the inverse of the third transfer function;
determining a second combined transfer function as the convolution of the second transfer function and the inverse of the fourth transfer function; and
subtracting the second combined transfer function from the first combined transfer function.

20. The vehicle of claim 19, comprising computer executable instructions that, when executed by the processor, cause the processor to determine a second audio signal originating from a second source at the second location, comprising:
determining a fourth combined audio signal, comprising:
determining a third convoluted signal as the convolution of the first combined audio signal and the inverse of the first transfer function;
determining a fourth convoluted signal as the convolution of the second combined audio signal and the inverse of the second transfer function; and
subtracting the fourth convoluted signal from the third convoluted signal;
determining the second audio signal as the convolution of the fourth combined audio signal and the inverse of a second computed transfer function, wherein the second computed transfer function is determined by:
determining a third combined transfer function as the convolution of the first transfer function and the inverse of the second transfer function;
determining a fourth combined transfer function as the convolution of the third transfer function and the inverse of the fourth transfer function; and
subtracting the fourth combined transfer function from the third combined transfer function.

* * * * *